(12) United States Patent (10) Patent No.: US 12,600,422 B2
Varisco et al. (45) Date of Patent: Apr. 14, 2026

(54) MOTOR VEHICLE

(71) Applicant: FERRARI S.P.A., Modena (IT)

(72) Inventors: Stefano Varisco, Modena (IT); Raffaele De Simone, Modena (IT)

(73) Assignee: FERRARI S.P.A., Modena (IT)

( * ) Notice: Subject to any disclaimer, the term of this patent is extended or adjusted under 35 U.S.C. 154(b) by 368 days.

(21) Appl. No.: 18/329,965

(22) Filed: Jun. 6, 2023

(65) Prior Publication Data

US 2023/0399066 A1 Dec. 14, 2023

(51) Int. Cl.
  B62D 63/04 (2006.01)
  B60K 26/02 (2006.01)
  B60N 2/24 (2006.01)
  B60T 7/10 (2006.01)
  B62D 1/12 (2006.01)

(52) U.S. Cl.
  CPC .............. B62D 63/04 (2013.01); B60K 26/02 (2013.01); B60N 2/24 (2013.01); B60T 7/102 (2013.01); B62D 1/12 (2013.01); *B60K 2026/026* (2013.01)

(58) Field of Classification Search
  CPC .......... B62D 63/04; B62D 1/12; B62D 5/001; B60K 26/02; B60K 2026/026; B60N 2/24; B60N 2/01; B60N 2/40; B60N 2/797; B60N 2/646; B60T 7/102; B60T 7/04
  See application file for complete search history.

(56) References Cited

U.S. PATENT DOCUMENTS

| | | | | | |
|---|---|---|---|---|---|
| 4,395,186 | A | * | 7/1983 | Whyte | A01B 75/00 |
| | | | | | 414/508 |
| 4,526,248 | A | * | 7/1985 | Johansen | A01B 75/00 |
| | | | | | 180/89.1 |
| 5,174,622 | A | | 12/1992 | Gutta | |

(Continued)

FOREIGN PATENT DOCUMENTS

| | | |
|---|---|---|
| CH | 180239 A | 10/1935 |
| DE | 906413 C | 3/1954 |

(Continued)

OTHER PUBLICATIONS

Italian Search Report for Application No. 102022000012170; Filing Date: Jun. 8, 2022; Date of Mailing—Jan. 5, 2023, 7 pages.

(Continued)

*Primary Examiner* — Drew J Brown
(74) *Attorney, Agent, or Firm* — CANTOR COLBURN LLP

(57) ABSTRACT

A motor vehicle comprising a plurality of wheels; at least one controllable driving system to control at least the speed and the orientation of said wheels; a control unit operatively connected to the driving system in order to adjust the operation of the driving system; and an interface configured to receive at least one driving command given by a driver; the motor vehicle further comprises a support structure defining a horseman-like driving position for the driver, who is in a prone position; the interface comprises a first control, which can be operated by a first hand of the driver, and a second control, which can be operated by a first foot of said driver; the first control is arranged in front of said second control (33; 34), with reference to a normal moving direction of the motor vehicle.

15 Claims, 5 Drawing Sheets

(56)     References Cited

U.S. PATENT DOCUMENTS

| 5,203,601 | A | 4/1993 | Guillot |
| 5,458,390 | A | 10/1995 | Gilbert |
| 5,509,717 | A | 4/1996 | Martin |
| 10,212,875 | B2 * | 2/2019 | Lacrouts-Cazenave ..................... A01D 45/001 |
| 10,518,673 | B2 * | 12/2019 | Lacrouts-Cazenave ..................... B60N 2/1842 |
| 2004/0079561 | A1 * | 4/2004 | Ozawa ................... B60P 3/423 180/21 |
| 2004/0129488 | A1 | 7/2004 | Chernoff et al. |
| 2006/0192403 | A1 | 8/2006 | Weddington et al. |
| 2015/0142289 | A1 * | 5/2015 | Katoh ...................... B62K 5/08 180/332 |
| 2020/0207399 | A1 | 7/2020 | De Simone |
| 2020/0207409 | A1 | 7/2020 | Dyar et al. |

FOREIGN PATENT DOCUMENTS

| DE | 202008012695 | U1 | 6/2009 |
| EP | 3992072 | A1 | 5/2022 |
| FR | 2962105 | A1 | 1/2012 |
| GB | 1276291 | A | 6/1972 |
| JP | 6964151 | B2 | 11/2021 |
| TW | 200415063 | A * | 8/2004 | .............. B62J 25/04 |
| WO | WO-2009077065 | A1 * | 6/2009 | ............. B62D 25/06 |

OTHER PUBLICATIONS

Extended European Search Report for European Application No. 23177567.7; Date of Mailing: Oct. 12, 2023, 17 pages.
Extended European Search Report for European Patent Application No. 23177567.7, Date of Mailing Dec. 14, 2023, 12 pages.
Office Action for the European Application No. 23177567.7, Dated: Nov. 26, 2025; 7 pages.

* cited by examiner

MOTOR VEHICLE

CROSS-REFERENCE TO RELATED APPLICATIONS

This patent application claims priority from Italian patent application no. 102022000012170 filed on Jun. 8, 2022, the entire disclosure of which is incorporated herein by reference.

TECHNICAL FIELD

The invention relates to a motor vehicle.

BACKGROUND

Motor vehicles are known, which comprise a body defining a passenger compartment as well as a plurality of driving systems and of respective controls, which can be operated by a driver in order to adjust the operation of the corresponding driving systems.

More in detail, example of driving systems consist of:

an engine comprising an output shaft operatively connected to a pair of drive wheels of the motor vehicle;

a gearbox interposed between the output shaft of the engine and the drive wheels and capable of being operated in order to obtain a plurality of gear ratios between the output shaft of the engine and the drive wheels; and a braking system, which can be activated in order to exert a braking torque upon the aforesaid wheels.

Corresponding non-limiting examples of the controls consist of:

a steering wheel arranged inside the passenger compartment and capable of being operated by the hands of the driver in order to steer the wheels;

an accelerator pedal, which can be operated by a foot of the driver in order to adjust the torque generated by the engine;

a clutch pedal, which can be operated by the foot of the driver in order to uncouple the output shaft of the engine and the drive wheels;

a lever, which can be operated by a hand of the driver in order to shift gears in the gearbox; and a brake pedal, which can be operated by the foot of the driver in order to operate the braking system of the motor vehicle.

The passenger compartment comprises, in turn, at least a pair of front seats and is delimited, at the front, by a dashboard and by a windshield arranged in front of the front seats, with reference to a normal moving direction of the motor vehicle.

In a known manner, one of the front seats defines a cockpit for a driver.

In this cockpit, the driver can operate the steering wheel and the gear lever with his/her own hands, the clutch pedal with the left foot and, alternatively, either the accelerator pedal or the brake pedal with the right foot.

Traditional motor vehicles have mechanical connections between the controls and input members of respective driving systems.

Solutions of the "drive by wire" kind were recently introduced in order to turn, in a functional manner and without mechanical members, the commands desired by the driver into corresponding operating signals for input members of respective driving systems.

More in detail, the "drive by wire" connection comprises:

an interface, which can be operated by the driver and is designed to receive the command desired by the driver; and a control unit, which is functionally connected to the interface and to the input members of the respective driving systems and is programmed to convert the desired command into an actuation signal for the operating member of the respective driving system.

When dealing with said "drive by wire" solutions, the automotive industry needs to improve the emotional involvement of the driver.

Furthermore, manufacturers need to increase the easiness of driving and of learning particularly challenging driving manoeuvres.

SUMMARY

The object of the invention is to provide a motor vehicle, which is capable of fulfilling at least one of the needs discussed above.

The aforesaid object is reached by the invention, as it relates to a motor vehicle as defined in claim 1, 2 or 14.

BRIEF DESCRIPTION OF THE DRAWINGS

The invention will be best understood upon perusal of the following detailed description of two preferred embodiments, which are provided by way of non-limiting example, with reference to the accompanying drawings, wherein.

DESCRIPTION OF EMBODIMENTS

Figure 1:
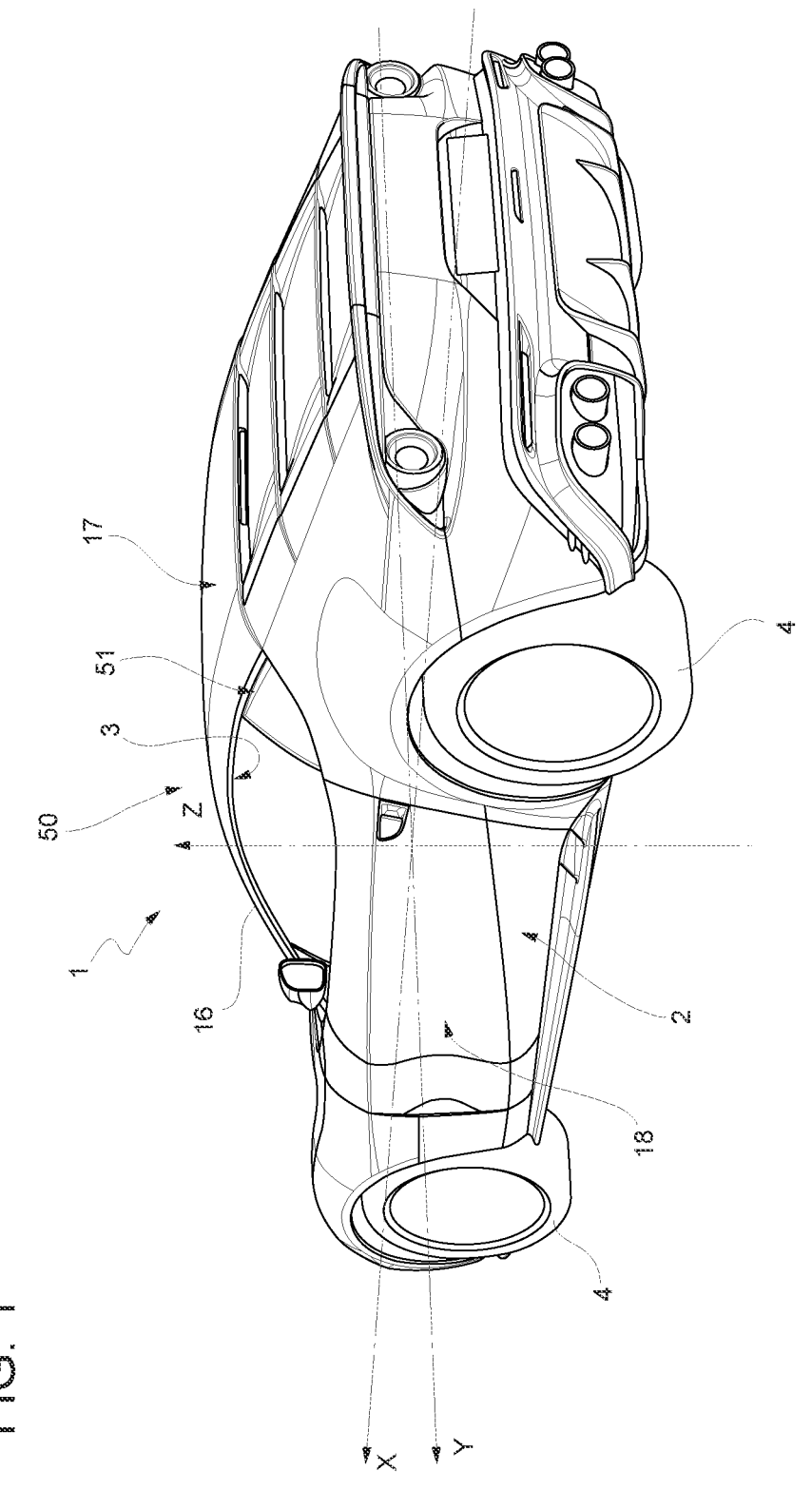
FIG. 1 is a perspective view of a motor vehicle according to the invention.

With reference to the accompanying Figures, number 1 indicates a motor vehicle comprising a body 2 defining a passenger compartment 3 and a plurality of wheels 4.

The motor vehicle 1 is a top-of-the-range motor vehicle designed both for a conventional urban/suburban use and for a racing track use.

Hereinafter, expressions such as "at the top", "at the bottom", "at the front", "at the back" and others similar to them are used with reference to a normal moving direction of the motor vehicle 1.

Furthermore, it is possible to define:

a longitudinal axis X integral to the motor vehicle 1, which, in use, is horizontal and parallel to a normal moving direction of the motor vehicle 1;

a transverse axis X integral to the vehicle 1, which, in use, is horizontal and orthogonal to the axis X; and an axis Z integral to the vehicle 1, which, in use, is vertical and orthogonal to the axes X, Y.

Figure 5:
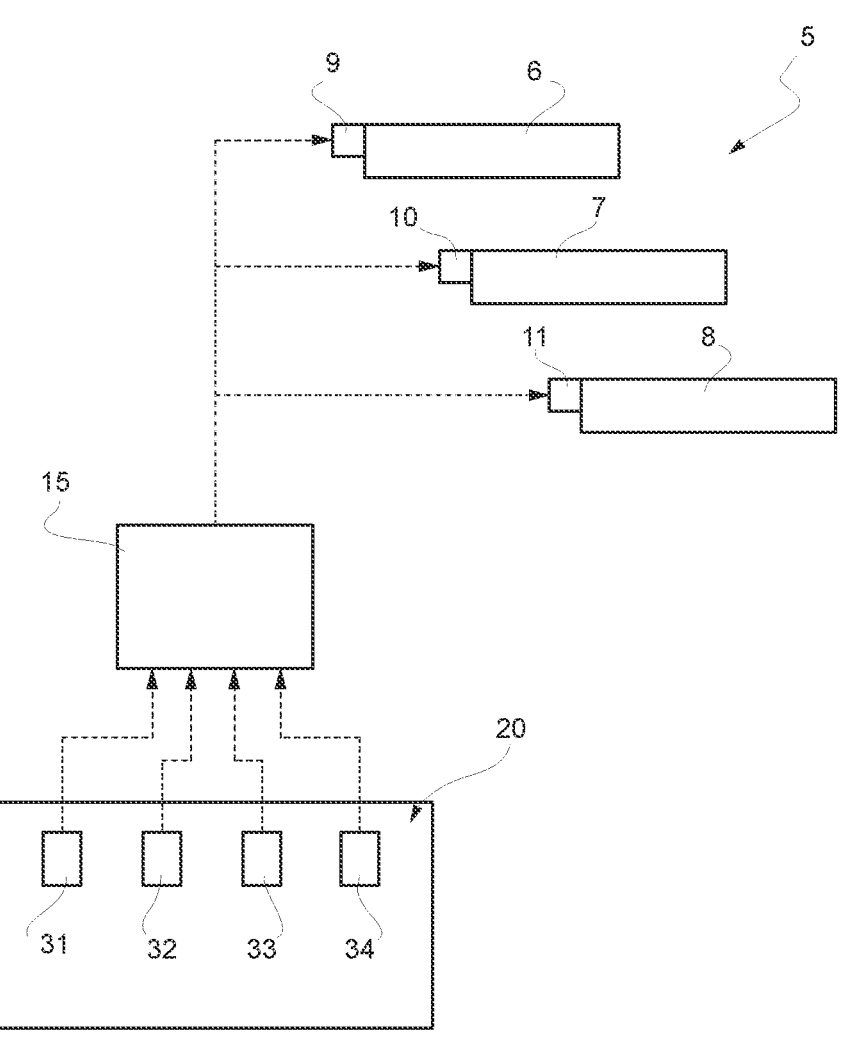
FIG. 5 schematically shows some components of the motor vehicle of FIGS. 1 to 4.

The motor vehicle 1 further comprises, in a known manner and as merely schematically shown in FIG. 5, a driving system 5, which can be operated so as to drive the motor vehicle 1 according to a trajectory desired by the driver 19 and with a speed that can be adjusted by the driver 19.

The driving system 5 basically comprises, as merely schematically shown in FIG. 5:

an engine 6, which can be operated so as to generate a torque exerted upon the drive wheels 4;

a steering system 7, which can be operated so as to adjust the inclination angle between the lying planes of the front wheels 4 and the axis X in order to drive the motor vehicle 1 along a curved trajectory; and a braking system 8, which can be operated so as to generate a braking torque exerted upon some of or all the wheels 4.

The engine 6, the steering system 7 and the braking system 8 comprise respective input members 9, 10, 11, which can be operated so as to adjust the respective values of torque, inclination angle and braking torque.

With reference to FIG. 5, the motor vehicle 1 further comprises:

an interface 20 configured to receive, from the driver 19, a plurality of commands concerning the trajectory and the desired speed of the motor vehicle 1; and a control unit 15, which is operatively connected to the interface 20 and the input members 9, 10, 11 and is programmed to convert the commands imparted by the driver 19 into corresponding laws of actuation for the input members 9, 10, 11.

It should be pointed out that the control unit 15 is solely electronically—and not mechanically—connected to the interface 20 and to the input members 9, 10, 11, so as to obtain a "drive by wire" driving system.

The motor vehicle 1 advantageously comprises a support structure 30 (FIGS. 2 to 4) defining a horseman-like driving position for the driver 19, who is in a prone position; the interface 10 comprises, in turn:

a pair of controls 31, 32, which can be operated by a left hand 21 and by a right hand 22 of the driver 19, respectively; and a pair of controls 33, 34, which can be operated by a left foot 23 and by a right foot 24 of the driver 19, respectively;

The controls 31, 32 are arranged in front of the controls 33, 34.

The driver 19 is in a prone position on the structure 30 and grasps the controls 31, 32 with the hands 21, 22 and holds the feet 31, 32 in the area of the controls 33, 34.

The support structure 30 is accommodated inside the passenger compartment 3 and basically comprises:

an upper end surface 35 defining a seat 36 for the driver 19 and an area 37 on which a stomach 25 of the driver 19 rests; and a pair of flanks 38 opposite one another, between which the surface 35 extends and which laterally delimit the support structure 30.

In particular, the area 37 is arranged in front of the seat 36, is inclined relative to the direction X and extends at progressively increasing distances from the seat 36, moving in the same direction as the normal moving direction of the motor vehicle 1.

The flanks 38 define resting surfaces 39 for the legs 40 of the driver 19.

The support structure 30 further comprises a pair of areas 41, on which respective arms 42 of the driver 19 can rest.

The areas 41 are defined by the surface 35, are spaced apart parallel to the axis Y and define respective extensions of the area 37 on the side opposite the seat 36.

The controls 31, 32 are arranged in the area of respective areas 41, so that they can be grasped by respective hands 21, 22 of the driver 19 in a prone position.

The controls 33, 34 are articulated on respective flanks 38, so that they can be operated by respective feet 23, 24 of the driver 19 in a prone position.

The control unit 15 is programmed to transform the activations imparted to the controls 31, 32 into respective operating signals for the input member 10 of the steering system 7, in case of actuation of only one of the controls 31, 32.

More in detail, the control unit 15 is programmed to:

generate an operating signal for the input member 10 corresponding to an increase in the radius of curvature, in case of a left bend, or to a reduction in the radius of curvature, in case of a right bend, in case of activation of the sole control 31; and generate an operating signal for the input member 10 corresponding to a reduction in the radius of curvature, in case of a right bend, or to an increase in the radius of curvature, in case of a left bend, in case of activation of the sole control 32.

The control unit 15 is programmed to transform the activations imparted to the controls 31, 32 into respective operating signals for the input member 11 of the braking system 8, in case of actuation of both controls 31, 32.

More in detail, the control unit 15 is programmed to generate an operating signal for the input member 11 of the braking system 8 corresponding to the generation of the maximum braking torque, in case of activation of both controls 31, 32, in case an emergency braking has to be carried out.

The control unit 15 is programmed to transform the activations imparted to the control 34 into an operating signal for the input member 9 of the engine 6.

More in detail, the control unit 15 is programmed to generate an operating signal for the input member 9 of the engine 6 corresponding to the generation of a torque proportional to the activation imparted to the control 34.

In other words, the control 34 fulfils the function of an accelerator.

The control unit 15 is programmed to generate an operating signal for the input member 11 of the braking system 8 corresponding to the generation of a braking torque proportional to the activation imparted to the control 33.

In other words, the control 33 fulfils the function of an brake.

In the case shown herein, the controls 31, 32 are joysticks and can be operated parallel to the axis X.

Furthermore, in the case shown herein, the controls 31, 32 project from the respective areas 41.

In particular, the controls 31, 33 are arranged on a right side (FIG. 2) and the controls 32, 34 are arranged on a left side (FIG. 3) of the support structure 30, moving in the same direction as the normal driving direction of the motor vehicle 1 along the axis X.

Figure 2:
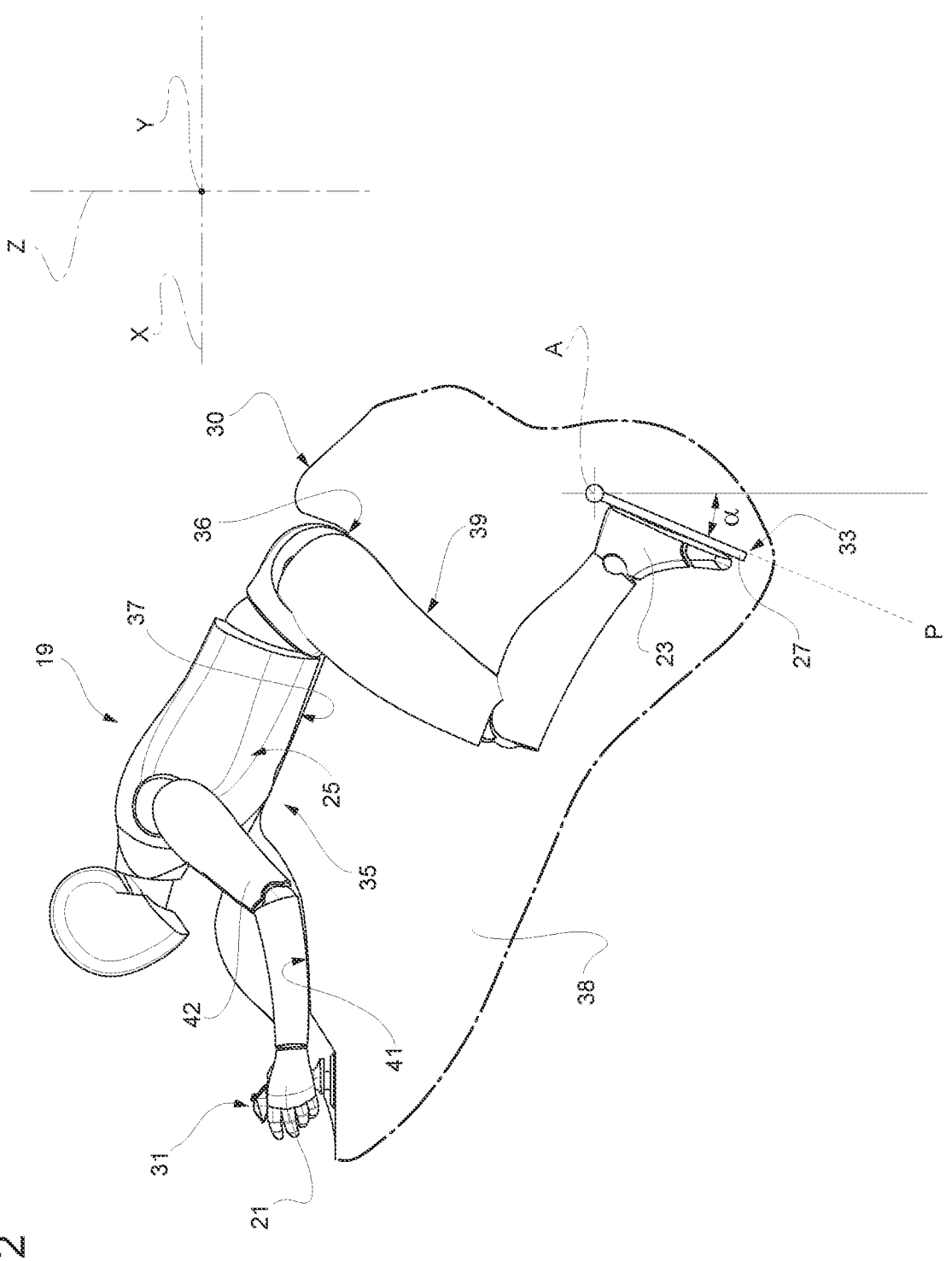
FIG. 2 is a side view, on a first side and on a larger scale, of a cockpit of the motor vehicle of FIG. 1.
Figure 3:
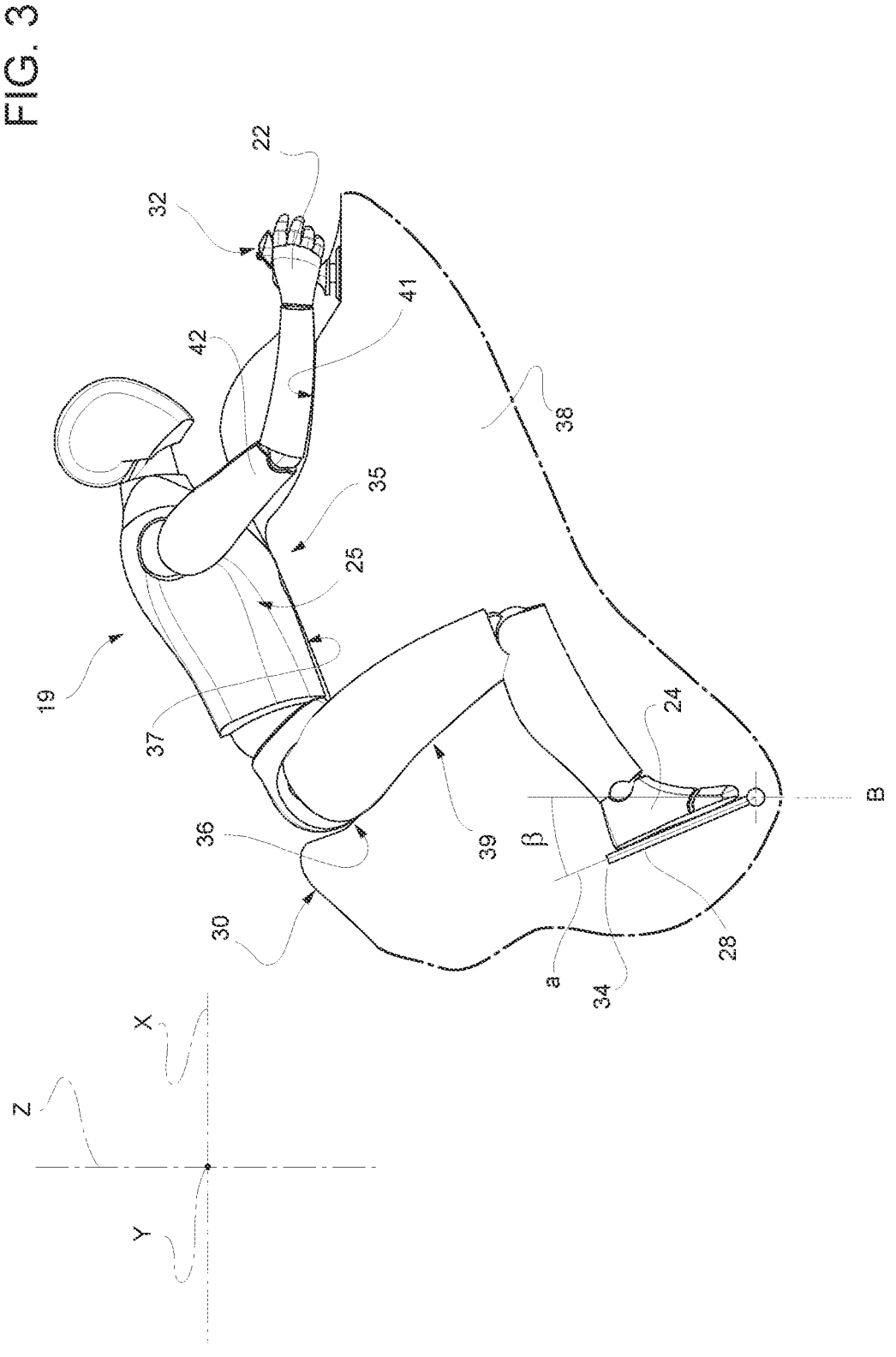
FIG. 3 is a side view, on a second side opposite the first one, of the cockpit of FIG. 2.
Figure 4:
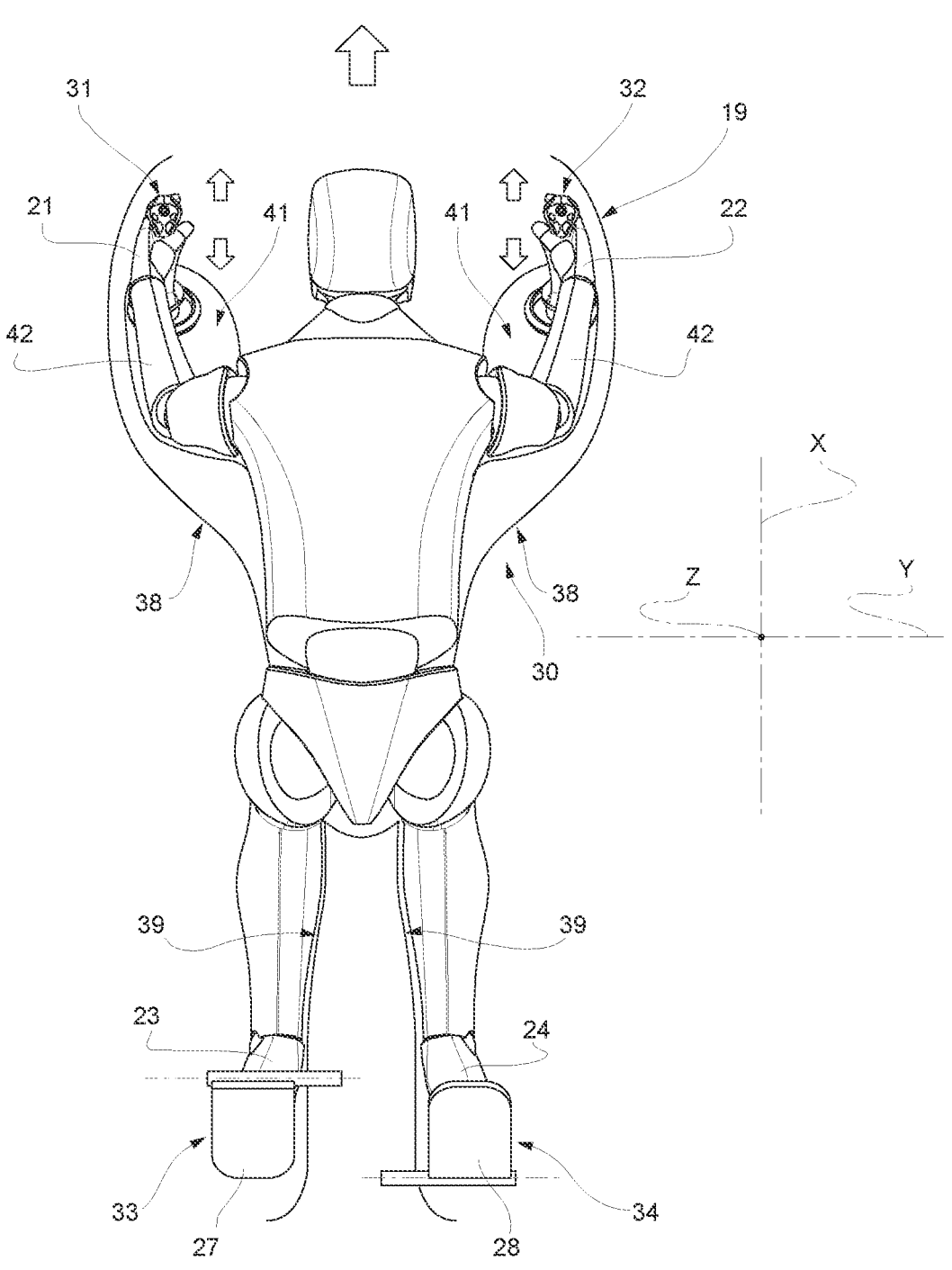
FIG. 4 is a top view of the cockpit of FIGS. 2 and 3.

With reference to FIGS. 2 to 4, the controls 33, 34 are pedals 27, 28 hinged to the support structure 30 around respective axes A, B, which are parallel to and staggered relative to one another and are parallel to the axis Y.

More in detail, the axis A is arranged in front of the axis B.

The pedal 27 is arranged under the axis A and lies on a plane P forming an acute angle α with the axis Z (FIG. 2).

The pedal 28 is arranged above the axis B and forms an acute angle α with the axis Z (FIG. 3).

The control unit 15 is programmed to generate an operating signal for the input member 11 of the braking system 8 corresponding to the generation of a braking torque increasing as the angle α imparted to the control 33 decreases.

The control unit 15 is programmed to generate an operating signal for the input member 9 of the engine 6 corresponding to the generation of a torque increasing as the angle β imparted to the control 34 increases.

The interface 20 further comprises a plurality of buttons, which can be operated by the driver 19, are operatively connected to the control unit 15 and are arranged on the support structure 30.

The motor vehicle 1 further comprises:

a windshield 16 delimiting the passenger compartment 3 at the front;

a backrest (not shown) delimiting the passenger compartment 3 at the back;

a roof 17 delimiting the passenger compartment 3 at the top; and a pair of doors 18, which are hinged to the body 2 and are movable between a closed position, in which they laterally delimit the passenger compartment 3 and prevent people from getting into/out of the passenger compartment 3, and an open position, in which they allow people to get into/out of the passenger compartment 3.

The passenger compartment 3 further comprises (FIG. 1):

a front region 50, which is delimited, at the front, by the windshield 16 and houses, in the specific case shown herein, the support structure 30 and a seat, which is not shown herein, arranged laterally next to one another along the direction Y; and a rear region 51 delimited, at the front, by the support structure 30 and by the backrest.

In use, the driver 19 is located on the support structure 30 in a prone position.

With reference, in particular, to FIGS. 2 to 4, the driver 19 sits on the seat 36 and lays the stomach 25 on the area 37 and the arms 42 on the areas 41.

Furthermore, the driver 19 grasps the controls 31, 32 with the left and right hands 21, 22, respectively, and holds the left and right feet 23, 24 on the respective pedals 27, 28 defining the respective controls 33, 34.

With reference to FIG. 5, the control unit 15 is programmed to transform the activations imparted by the driver 19 to the controls 31, 32, 33 and 34 into respective operating signals for the input members 9, 10, 11.

More in detail, in case of activation of the sole control 31, the control unit 15 generates an operating signal for the input member 10 of the steering system 7 corresponding to an increase in the radius of curvature, in case of a left bend, or to a reduction in the radius of curvature, in case of a right bend, in case of activation of the sole control 31.

In case of activation of the sole control 32, the control unit 10 is programmed to generate an operating signal for the input member 10 corresponding to a reduction in the radius of curvature, in case of a right bend, or to an increase in the radius of curvature, in case of a left bend.

In case an emergency braking has to be carried out, the driver 19 operates both controls 31, 32. Following this activation, the control unit 15 is programmed to generate an operating signal for the input member 11 of the braking system 8 corresponding to the generation of the maximum braking torque acting upon the wheels 4.

In case the motor vehicle 1 has to be accelerated, the driver 19 operates the control 34. Following this activation, the control unit 15 is programmed to generate an operating signal for the input member 9 of the engine 6 corresponding to the generation of a torque increasing as the angle β imparted to the control 34 increases.

More precisely, in case of acceleration, should the backward load transfer determine an increase in the angle R imparted to the pedal 28, the latter remains in contact with the foot 24. In this way, the ability to adjust the acceleration desired by the driver 19 is maintained.

In an embodiment, the control unit 15 is programmed to generate a haptic feedback, which prevents the acceleration from increasing, requesting a greater effort to the user 19.

In case the motor vehicle 1 has to brake, the driver 19 operates the control 33. Following this activation, the control unit 15 is programmed to generate an operating signal for the input member 11 of the braking system 8 corresponding to the generation of a braking torque increasing as the angle α imparted to the control 33 decreases.

In case of braking, should the forward load transfer determine a forward movement of the tip of the foot 24, there is an increase in the angle α imparted to the pedal 27 and, consequently, in the braking torque acting upon the wheels 4, without generating any risk for the safety of the motor vehicle 1.

The disclosure above reveals evident advantages that can be obtained with the invention.

More in detail, the motor vehicle 1 comprises a support structure 30 defining a horseman-like driving position for the driver 19, who is in a prone position. From this driving position, the driver 19 can operate the controls 31, 32 with the hands 21, 22, namely the left and right hand respectively, and the controls 33, 34 with the feet 23, 24, namely the left and right foot respectively, thus controlling the driving systems 5 of the motor vehicle 1.

Thanks to this, it is possible to increase the emotional involvement of the driver 19, who enjoys more the dynamic driving sensations and, in particular, the speed of the motor vehicle 1.

Furthermore, the driving and learning easiness can be increased, for the prone position allows for a more aware and a more easily visually controllable perception of the trajectories set and/or to be set.

The controls 31, 32 allow the driver 19 to control the steering system 7 through the hands 21, 22, while the controls 33, 34 allow the driver 19 to control the braking system 8 and the engine 6 through the feet 23, 24.

Therefore, it is possible to reproduce the distribution of controls typical of a traditional motor vehicle with steering wheel, brake and accelerator pedal, reducing learning times and/or risks of error of the driver 19.

Finally, the pedal 28 serving as accelerator is arranged under the axis A (FIG. 2).

In this way, in case of acceleration, should the backward load transfer determine an increase in the angle R imparted to the pedal 28, the latter remains in contact with the foot 24.

By so doing, the ability to adjust the acceleration desired by the driver 19 can be maintained.

The pedal 27 serving as brake is arranged under the axis B (FIG. 3).

In this way, in case of braking, should the forward load transfer determine a forward movement of the tip of the foot 24, there is an increase in the angle α imparted to the pedal 27 and, consequently, in the braking torque acting upon the wheels 4, without generating any risk for the safety of the motor vehicle 1.

Finally, the motor vehicle 1 according to the invention can be subjected to changes and variations, which, though, do not go beyond the scope of protection set forth in the appended claims.

In particular, the support structure 30 could comprise a control 31, 32 and one single control 33, 34.

Furthermore, the front region 50 could not comprise the seat and the support structure 30 could be arranged at the centre along the direction Y within the front region.

The invention claimed is:

1. A motor vehicle comprising:
a plurality of wheels;
at least one controllable driving system to control at least a speed and an orientation of said wheels;
a control unit operatively connected to said driving system in order to adjust an operation of the driving system;
an interface configured to receive, in use, at least one driving command given by a driver;
at least one input member, which can be operated so as to control a trajectory and a moving speed of said motor vehicle; and
a support structure defining a driving position for said driver, who, in use, is in a prone position;
said interface comprising, in turn:
a first control, which can be operated, in use, by a first hand of said driver; and
a second control, which can be operated, in use, by a first foot of said driver;
wherein said first control is arranged in front of said second control, with reference to a normal moving direction of said motor vehicle;
wherein said control unit is operatively connected to said interface and to said at least one input member so as to obtain a drive-by-wire driving mode, and
wherein the motor vehicle further comprises a body defining a passenger compartment;
said passenger compartment comprising, with reference to said normal moving direction:
a front portion, where said support structure is arranged; and
a rear portion.

2. The motor vehicle according to claim 1, wherein said support structure supports said first and second control in a movable manner.

3. The motor vehicle according to claim 1, wherein said support structure comprises:
a surface defining a first hollow seat for said driver and a first area on which, in use, said driver can place a stomach; and
a pair of side flanks arranged on respective opposite sides of said surface and on which, in use, said driver can at least partly place the legs;
wherein said second control is mounted in a movable manner relative to a respective flank, so that it can be operated by the respective first foot;
said surface extending between said side flanks.

4. The motor vehicle according to claim 3, wherein said support structure defines a pair of second areas, on which, in use, said driver can place the arms and which are laterally delimited by respective side flanks;
said first control being arranged in a respective second area, so that it can be grabbed by said first hand.

5. The motor vehicle according to claim 4, wherein said interface further comprises a plurality of keys, which can be operated by said driver, are operatively connected to said control unit and are arranged on said support structure and operatively connected to said control unit.

6. The motor vehicle according to claim 1, wherein said first control is a joystick, and/or in that said second control is a pedal.

7. The motor vehicle according to claim 1, wherein said interface further comprises:
a third control, which can be operated, in use, by a second hand of said driver; and
a fourth control, which can be operated, in use, by a second foot of said driver;
said third control being arranged in front of said fourth control, with reference to a normal moving direction of said motor vehicle;
said first and third control and said second and fourth control being arranged in a symmetrical manner relative to said support structure.

8. The motor vehicle according to claim 7, wherein said driving system comprises, in turn:
a steering system operatively connected to said wheels in order to adjust a steering angle of the wheels;
said control unit being programmed to cause a first input member of said steering system to increase said steering angle, in case of a bend in a first direction, and to reduce said steering angle, in case of a bend in a second direction contrary to said first direction, following the operation, in use, of said first control;
said control unit being programmed to cause said first input member to increase said steering angle, in case of a bend said second direction, and to reduce said steering angle, in case of a bend said first direction, following the operation, in use, of said second control.

9. The motor vehicle according to claim 8, characterized in that said driving system further comprises a braking system, which is operatively connected to said wheels and can be operated in order to exert a braking torque upon at least some of said wheels;
said control unit being programmed to:
cause a second input member of said braking system to exert said braking torque, following the operation, in use, of said second control; and/or
cause said braking system to exert the maximum braking torque value following the simultaneous operation, in use, of said first and third control.

10. The motor vehicle according to claim 9, characterized in that said driving system comprises an engine, which can be operated in order deliver an adjustable torque to at least one of said wheels;
said control unit being programmed to cause a third input member of said engine to increase said torque following the operation, in use, of said fourth control.

11. The motor vehicle according to claim 7, characterized in that said second and fourth control comprise a first and a second pedal, respectively, which are hinged to said motor vehicle around a first and second axis, respectively, which are transverse to said normal moving direction;
said first pedal being arranged, in use, under said first axis;
said second pedal being arranged, in use, above said first axis.

12. The motor vehicle according to claim 1, wherein said front portion comprises a seat for a passenger arranged beside said support structure; or in that said support structure is arranged at a center in said front portion.

13. A motor vehicle comprising:
a plurality of wheels;
at least one controllable driving system to control at least a speed and an orientation of said wheels;
a control unit operatively connected to said driving system in order to adjust an operation of the driving system; and
an interface configured to receive, in use, at least one driving command given by a driver;

a support structure defining a driving position for said driver, who, in use, is in a prone position;

said interface comprising, in turn:

a first control, which can be operated, in use, by a first hand of said driver; and a second control, which can be operated, in use, by a first foot of said driver;

wherein said first control is arranged in front of said second control, with reference to a normal moving direction of said motor vehicle;

wherein said support structure defines a pair of areas, on which, in use, said driver can place the arms and which are laterally delimited by respective side flanks;

said first control being arranged in a respective area, so that it can be grabbed by said first hand.

14. A motor vehicle comprising:

a plurality of wheels;

at least one controllable driving system to control at least a speed and an orientation of said wheels;

a control unit operatively connected to said driving system in order to adjust an operation of the driving system;

an interface configured to receive, in use, at least one driving command given by a driver; and a support structure defining a driving position for said driver, who, in use, is in a prone position;

said interface comprising, in turn:

a first control, which can be operated, in use, by a first hand of said driver; and a second control, which can be operated, in use, by a first foot of said driver;

said first control being arranged in front of said second control, with reference to a normal moving direction of said motor vehicle;

wherein the motor vehicle comprises a body defining a passenger compartment;

wherein said passenger compartment comprises, with reference to said normal moving direction:

a front portion, where said support structure is arranged; and a rear portion, wherein said support structure comprises a surface defining a first hollow seat for said driver and a first area on which, in use, said driver can place a stomach; and a pair of side flanks arranged on respective opposite sides of said surface and on which, in use, said driver can at least partly place the legs;

wherein said second control being mounted in a movable manner relative to a respective flank so that it can be operated by the respective first foot; and wherein said surface extends between said side flanks.

15. A motor vehicle comprising:

a plurality of wheels;

at least one controllable driving system to control at least a speed and an orientation of said wheels;

a control unit operatively connected to said driving system in order to adjust an operation of the driving system;

an interface configured to receive, in use, at least one driving command given by a driver; and a support structure defining a driving position for said driver, who, in use, is in a prone position;

said interface comprising, in turn:

a first control, which can be operated, in use, by a first hand of said driver; and a second control, which can be operated, in use, by a first foot of said driver;

a third control, which can be operated, in use, by a second hand of said driver; and a fourth control, which can be operated, in use, by a second foot of said driver;

wherein said first control being arranged in front of said second control, with reference to a normal moving direction of said motor vehicle;

wherein said third control being arranged in front of said fourth control, with reference to a normal moving direction of said motor vehicle;

wherein said first and third control and said second and fourth control being arranged in a symmetrical manner relative to said support structure;

wherein the motor vehicle comprises a body defining a passenger compartment;

wherein said passenger compartment comprises, with reference to said normal moving direction:

a front portion, where said support structure is arranged; and a rear portion;

wherein said driving system comprises, in turn:

a steering system operatively connected to said wheels in order to adjust a steering angle of the wheels;

wherein said control unit being programmed to cause a first input member of said steering system to increase said steering angle, in case of a bend in a first direction, and to reduce said steering angle, in case of a bend in a second direction contrary to said first direction, following the operation, in use, of said first control; and wherein said control unit being programmed to cause said first input member to increase said steering angle, in case of a bend said second direction, and to reduce said steering angle, in case of a bend said first direction, following the operation, in use, of said second control.

* * * * *